(12) United States Patent
Thompson et al.

(10) Patent No.: US 8,938,913 B2
(45) Date of Patent: Jan. 27, 2015

(54) SELF-LOCATING DOOR INTERLOCK APPARATUS AND ENCLOSURES, ASSEMBLIES, AND METHODS INCLUDING SAME

(71) Applicant: Siemens Industry, Inc., Alpharetta, GA (US)

(72) Inventors: Truett Ramsey Thompson, Raleigh, NC (US); Juan Carlos Cortes Arreygue, Morelia (MX); Terrance Woodyard, Raleigh, NC (US)

(73) Assignee: Siemens Industry, Inc., Alpharetta, GA (US)

( * ) Notice: Subject to any disclaimer, the term of this patent is extended or adjusted under 35 U.S.C. 154(b) by 0 days.

(21) Appl. No.: 13/623,608

(22) Filed: Sep. 20, 2012

(65) Prior Publication Data

US 2013/0318881 A1 Dec. 5, 2013

Related U.S. Application Data

(60) Provisional application No. 61/655,820, filed on Jun. 5, 2012.

(51) Int. Cl.
*E05B 65/06* (2006.01)
(52) U.S. Cl.
USPC ............................................. 49/394; 292/341
(58) Field of Classification Search
CPC .............................. E05B 15/024; E05B 85/045
USPC .............. 49/394, 396; 292/340, 341, 341.15, 292/341.18, 341.19; 70/78–84, 117, 125, 70/140
See application file for complete search history.

(56) References Cited

U.S. PATENT DOCUMENTS

| | | | | |
|---|---|---|---|---|
| 2,860,903 | A * | 11/1958 | Narancich et al. | 292/48 |
| 7,416,228 | B2 * | 8/2008 | Pfitzinger et al. | 292/216 |
| 8,272,169 | B2 * | 9/2012 | Mahdi | 49/449 |
| 8,382,171 | B2 * | 2/2013 | Williams | 292/341 |
| 8,469,413 | B2 * | 6/2013 | Novajovsky et al. | 292/341.19 |
| 2002/0000727 | A1 * | 1/2002 | Rass et al. | 292/216 |
| 2008/0034665 | A1 * | 2/2008 | Schaaf et al. | 49/396 |
| 2010/0084877 | A1 * | 4/2010 | Gledhill et al. | 292/341.19 |
| 2010/0180511 | A1 * | 7/2010 | Mahdi | 49/501 |
| 2011/0210568 | A1 * | 9/2011 | Williams | 292/341.15 |
| 2012/0067895 | A1 * | 3/2012 | Williams | 220/324 |
| 2012/0292922 | A1 * | 11/2012 | Andiano et al. | 292/56 |
| 2013/0031844 | A1 * | 2/2013 | Quinn et al. | 49/503 |
| 2013/0180991 | A1 * | 7/2013 | Williams | 220/324 |

* cited by examiner

*Primary Examiner* — Katherine Mitchell
*Assistant Examiner* — Scott Denion

(57) ABSTRACT

A door interlock apparatus is disclosed. The door interlock apparatus has a body configured to couple to a first one of a door and an enclosure structure, the body having one or more angled self-locating features, a locking protrusion extending from a surface of the body and configured to couple with the locking member of an interlock mechanism, and a misalignment-accommodating mechanism configured and adapted to allow motion of the body. The door interlock apparatus aligns the locking protrusion and locking member during door closing, even when the door and enclosure structure are substantially misaligned. Electrical component enclosures, door interlock assemblies, and methods of assembling a door interlock assembly are also provided, as are other aspects.

15 Claims, 10 Drawing Sheets

FIG. 2B  FIG. 2C

SELF-LOCATING DOOR INTERLOCK APPARATUS AND ENCLOSURES, ASSEMBLIES, AND METHODS INCLUDING SAME

RELATED APPLICATIONS

This application claims priority to U.S. Provisional Patent Application Ser. No. 61/655,820 filed on Jun. 5, 2012, entitled "Self-Locating Door Interlock," the disclosure of which is hereby incorporated by reference in its entirety herein.

FIELD

The invention relates generally to door interlock apparatus, and more particularly to door interlock apparatus for electrical component enclosures.

BACKGROUND

Switchboards, panelboards, and motor controller enclosures having one or more access doors may include electrically-energized components therein. UL 347 specifies that mechanical interlocks should be provided on certain of these enclosures in order to prevent operators from opening such equipment access doors when the equipment being protected is still electrically energized. This minimizes safety hazards to the operators.

In conventional mechanical interlocks used in the past to accomplish a locking function on such doors, a locking protrusion (pin) has been welded directly to the door. This locking protrusion interfaces with a conventional door interlock mechanism. However, because all doors are not perfectly manufactured or assembled, the mechanical interlock may not always function properly.

Accordingly, a need exists to improve the mechanical interlock so as to improve performance thereof.

SUMMARY

According to a first aspect, a door interlock apparatus is provided. The door interlock apparatus includes a body configured to couple to a first one of a door and an enclosure door frame, the body having one or more angled self-locating features; a locking protrusion extending from a surface of the body and configured to couple with a locking member of an interlock mechanism; and a misalignment-accommodating mechanism configured and adapted to allow motion of the body.

According to a further aspect, a door interlock assembly is provided. The door interlock assembly includes a door interlock apparatus having a body configured to couple to a first one of a door and a enclosure structure, the body having one or more angled self-locating features, a locking protrusion extending from the body, a misalignment-accommodating mechanism configured to allow motion of the body; and an interlock mechanism configured to couple to a second one of the door and the enclosure structure, the interlock mechanism having a locking member configured to couple with the locking protrusion.

According to a further aspect, an electrical component enclosure is provided. The electrical component enclosure includes an enclosure structure having an enclosure door frame; a door hinged to the enclosure structure; and a door interlock apparatus having a body configured to couple to a first one of the door and the enclosure structure, the body having one or more angled self-locating features, a locking protrusion extending from the body, a misalignment-accommodating mechanism configured to allow motion of the body; and an interlock mechanism configured to couple to a second one of the door and the enclosure structure, the interlock mechanism having a locking member configured to couple with the locking protrusion.

According to still another aspect, a method of operating a door interlock assembly is provided. The method includes providing a door hinged to an enclosure structure; providing a door interlock apparatus having a body coupled to a first one of the door and the enclosure structure, the body having one or more angled self-locating features, a locking protrusion, and a misalignment-accommodating mechanism; providing an interlock mechanism coupled to another one of the door and the enclosure structure, the interlock mechanism having a locking member coupleable with the locking protrusion; and closing the door and engaging the locking member with one of the angled self-locating features causing movement of the body wherein the misalignment-accommodating mechanism allows the movement of the body so as to align the locking protrusion with the locking member.

Still other aspects, features, and advantages of the invention may be readily apparent from the following detailed description wherein a number of example embodiments and implementations are described and illustrated, including the best mode contemplated for carrying out the invention. The invention may also be capable of other and different embodiments, and its several details may be modified in various respects, all without departing from the scope of the invention. Accordingly, the drawings and descriptions are to be regarded as illustrative in nature, and not as restrictive. The drawings are not necessarily drawn to scale. The invention covers all modifications, equivalents, and alternatives falling within the scope of the invention.

BRIEF DESCRIPTION OF DRAWINGS

FIGS. 2B and 2C illustrate front and rear perspective views of a body of a door interlock apparatus according to embodiments.

DETAILED DESCRIPTION

Figure 1A:
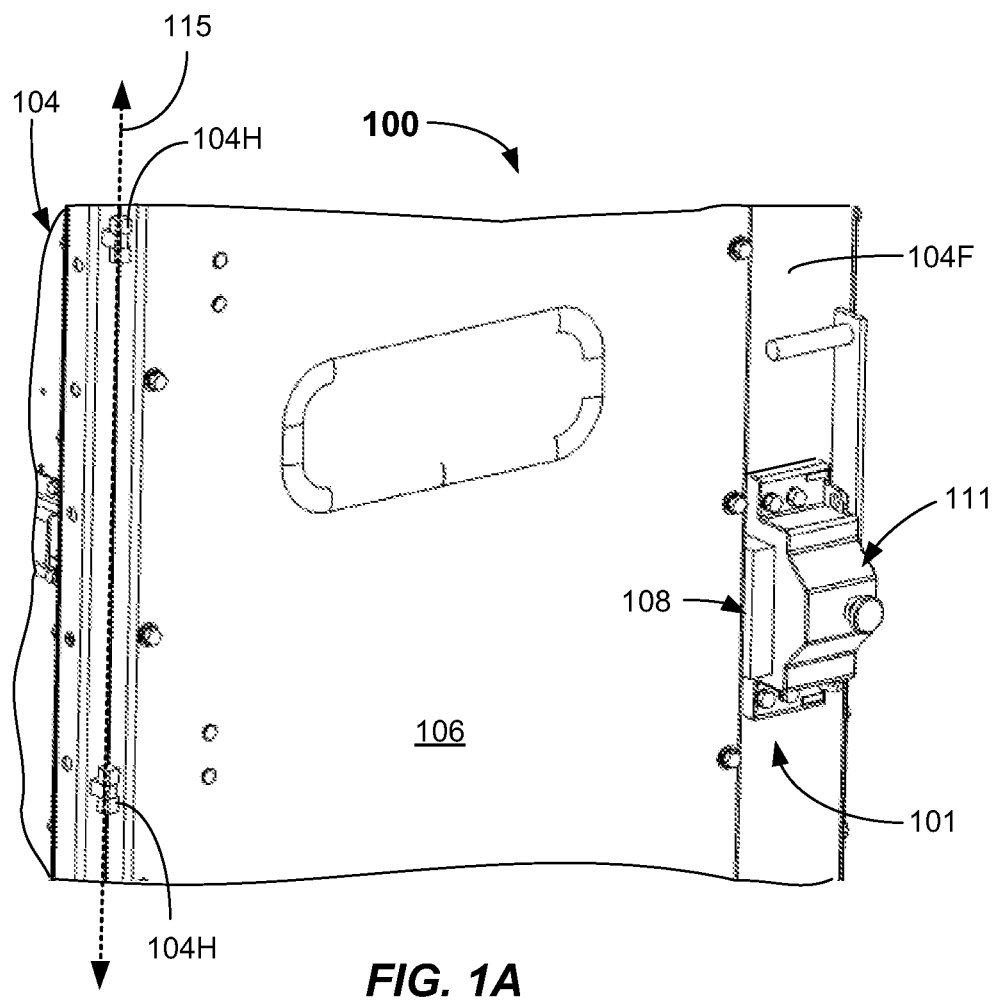
FIG. 1A illustrates a partial perspective view of an electrical component enclosure including an improved door interlock apparatus according to embodiments.
Figure 1B:
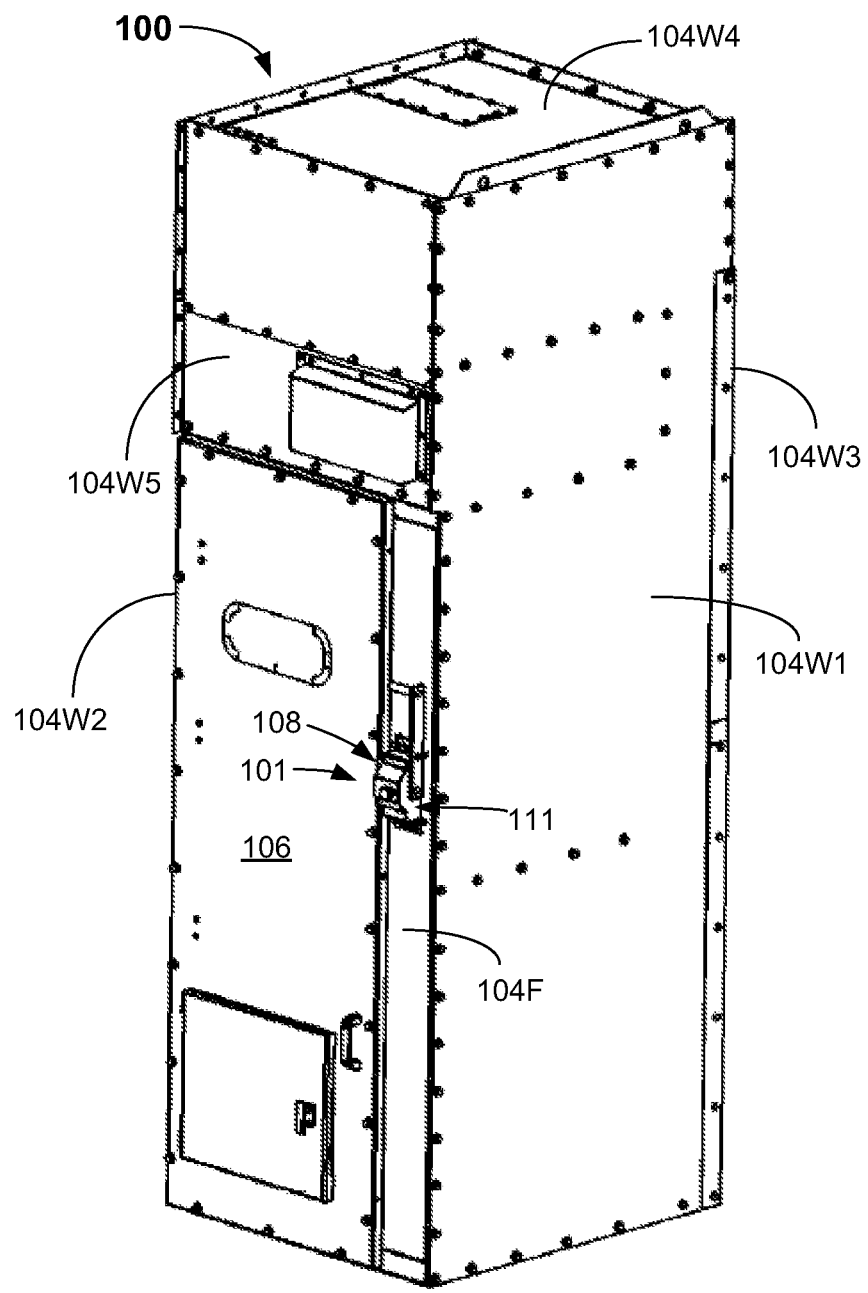
FIG. 1B illustrates a full perspective view of an electrical component enclosure including an improved door interlock apparatus.
Figures 1C, 1D:
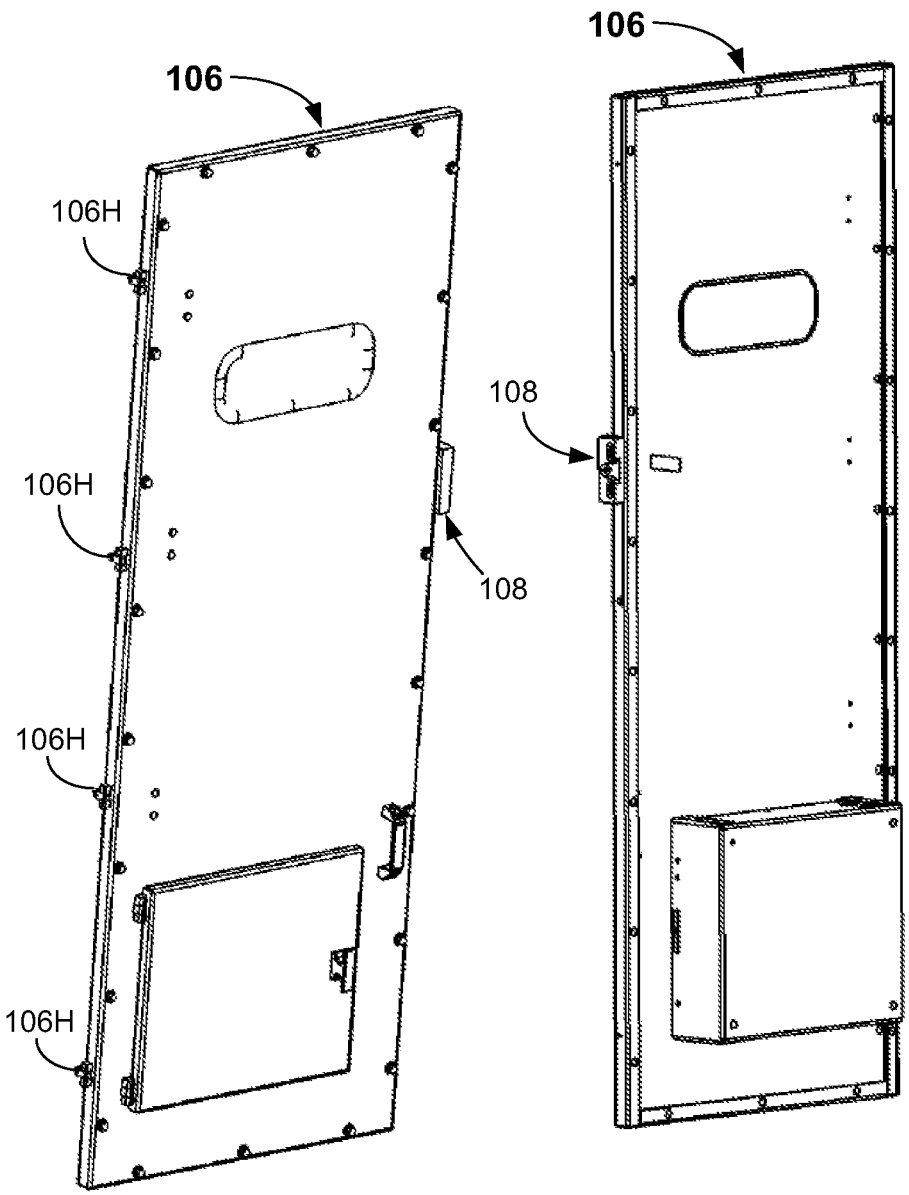
FIGS. 1C and 1D illustrate front and rear perspective views of a door of an enclosure including an improved door interlock apparatus according to embodiments.
Figure 2A:
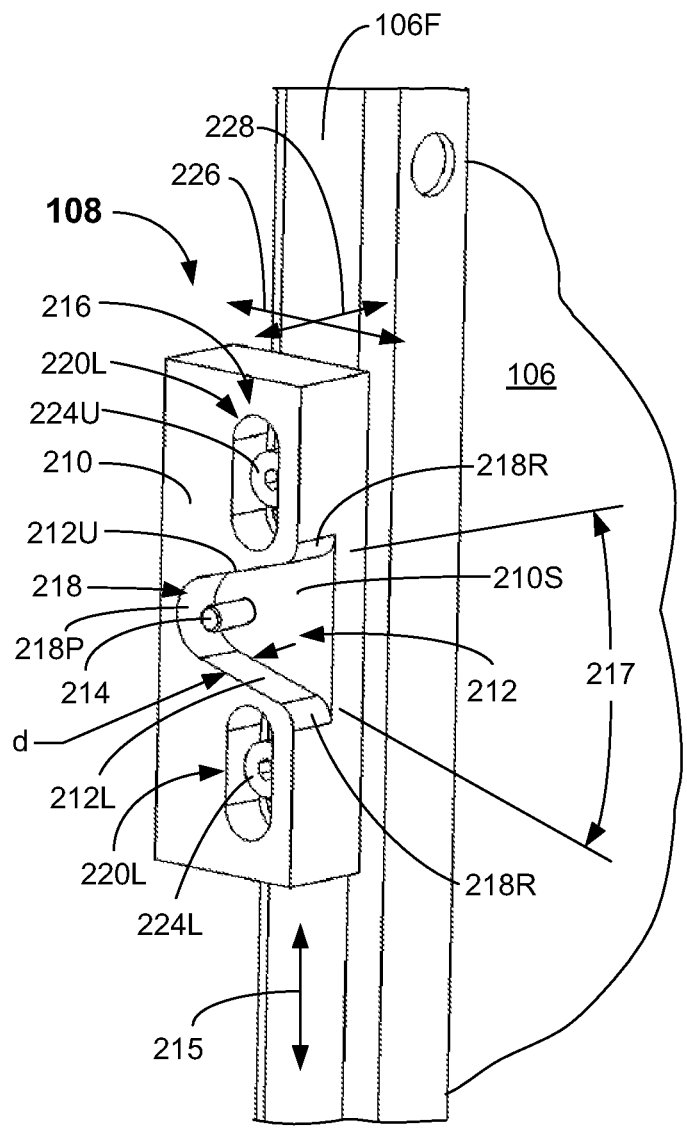
FIG. 2A illustrates a perspective view of an improved door interlock apparatus according to embodiments.
Figure 2D:
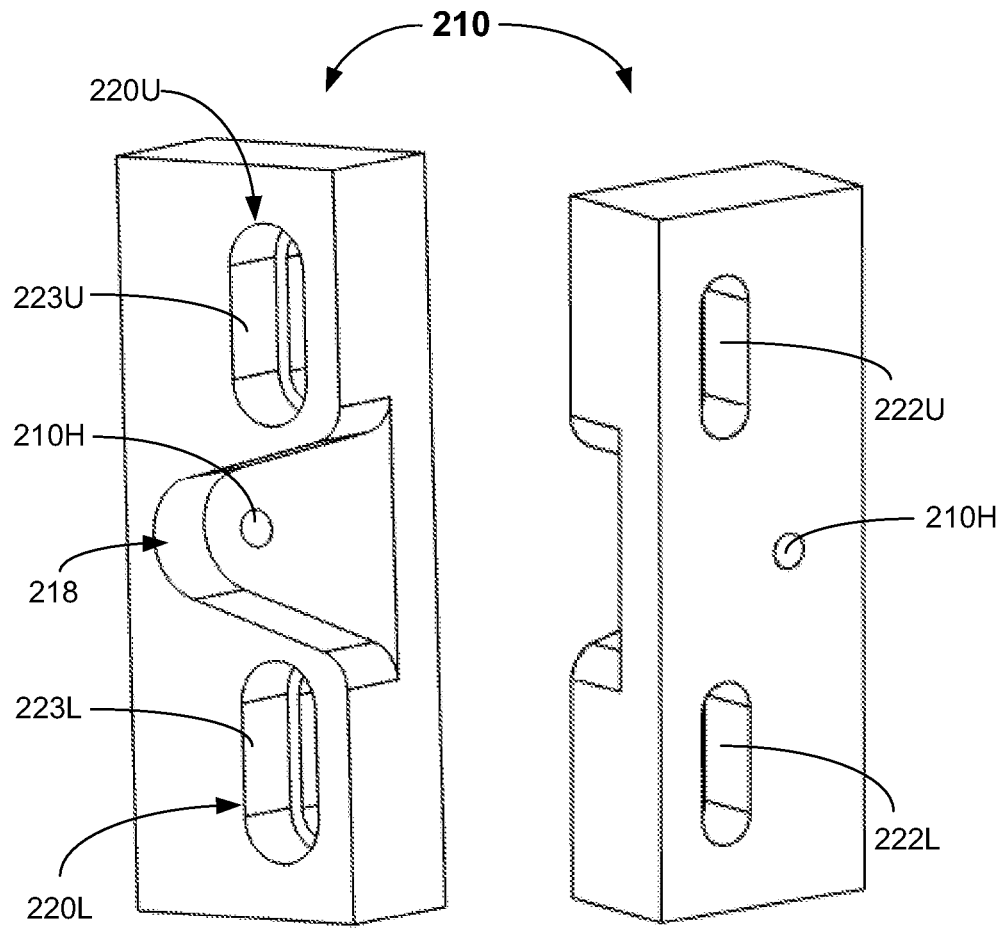
FIG. 2D illustrates a front plan view of a slider of a door interlock apparatus according to embodiments.
Figure 2D:
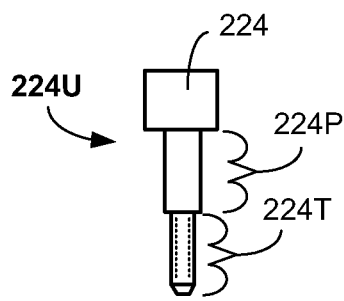
Figure 2E:
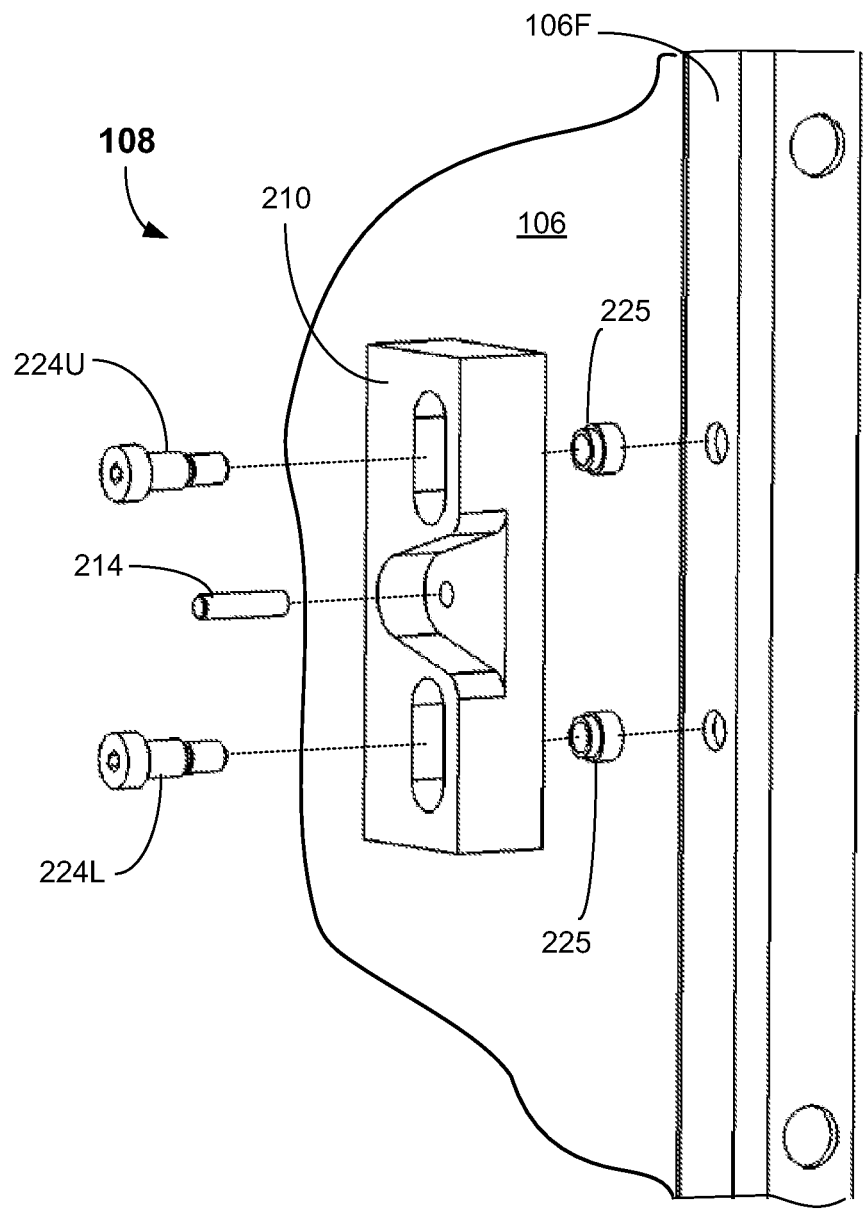
FIG. 2E illustrates an exploded view of various components of a door interlock apparatus according to embodiments.

Reference will now be made in detail to the example embodiments of this disclosure, which are illustrated in the accompanying drawings. Wherever possible, the same reference numbers will be used throughout the drawings to refer to the same or like parts.

The aforementioned problem of a mechanical interlock that does not always function properly involves misalignment of the locking protrusion and the locking member of the mechanical interlock. The misalignment may be due to tolerance stack-ups, initial factory assembly, distortion due to transportation, installation, installation and assembly at the final location, and/or door hinge wear. However, such misalignment may make it difficult to close the mechanical interlock. In particular, the welded pin may be so misaligned that door closing is difficult. Accordingly, embodiments of the present invention improve the mechanical interlock and facilitate easy door closing and interlocking. In particular, embodiments of the invention comprising a door interlock apparatus that improve an orientation and alignment of a locking protrusion with a locking member of the interlock mechanism. As such, interlock latching is accomplished more seamlessly and is forgiving of misalignment. Moreover, embodiments also allow rapid replacement of the door interlock apparatus, if necessary.

Thus, in one or more aspects, a door interlock apparatus, is provided having a body configured to couple to a door or an enclosure structure (e.g., door frame). The body has one or more angled self-locating features, and a locking protrusion extends from the body. A misalignment-accommodating mechanism is configured to allow motion of the body relative to the component it is coupled to (e.g., door or an enclosure structure). The door interlock apparatus cooperates with a conventional interlock mechanism to allow rapid closing and interlocking of the door. The interlock mechanism couples to the other of the door and the enclosure structure, and has a locking member that couples with the locking protrusion to provide the door interlocking feature. Upon closing the door and engaging the locking member with one of the angled self-locating features, movement of the body is caused along the door or enclosure wherein the misalignment-accommodating mechanism allows the body to move in order to properly align the locking protrusion with the locking member. In this way, substantial initial misalignment may be present due to tolerance stack-ups, initial factory assembly, transportation, assembly and installation at the final destination, and/or wear and rapid closing and interlocking may still be accomplished.

Electrical component enclosures including the door interlock apparatus, door interlock assemblies, and methods of operating a door interlock assembly are provided, as will be explained in greater detail below in connection with FIGS. 1A-4 herein.

FIGS. 1A-1D illustrate an electrical component enclosure 100 and components thereof that may be used to contain one or more electrical components, such as low-voltage, medium-voltage, or high-voltage electrical components, such as an electrical contactor, load break switch, or other switch (e.g., a high-voltage switch). Other low-, medium- or high-voltage electrical components may be contained within the electrical component enclosure 100, as well. Electrical component enclosure 100 may include a door interlock assembly 101 operative to interlock a door 106 to an enclosure structure 104 of the electrical component enclosure 100. The enclosure structure 104 may have various walls forming an enclosed space that contains an electrical component. The walls may include side walls 104W1, 104W2, rear wall 104W3, top wall 104W4, bottom wall (not shown), and front wall 104W5 including an enclosure door frame 104F defining an opening that is closed by the door 106. The door frame 104F may be a reinforced area of the enclosure structure 104, or may simply be a front wall structure surrounding the opening closed by the door 106. Door 106 may overlap the opening. The door 106 may be hinged to the enclosure structure 104, such as by one or more hinges 104H such that upon opening or closing, the door rotates away from or towards the opening, respectively.

The door interlock assembly 101 includes a door interlock apparatus 108 and an interlock mechanism 111, wherein the interlock mechanism 111 interlocks with the door interlock apparatus 108. The door interlock apparatus 108 may be configured to couple to a first one of the door 106 and the enclosure structure (e.g., enclosure door frame 104F). The interlock mechanism 111 may be configured to couple to a second one of the door 106 and the enclosure door frame 104F. In the depicted embodiment, the door interlock apparatus 108 is coupled to a door 106 of the electrical component enclosure 100, and the interlock mechanism 111 is coupled to the enclosure structure 104 (e.g., to the enclosure door frame 104F). However, this construction may be reversed in some embodiments wherein the door interlock apparatus 108 may be coupled to the enclosure structure 104, and the interlock mechanism 111 may be coupled to the door 106. The interlock mechanism 111 may comprise a conventional interlock mechanism, such as a model A67-009-A3 interlock available from Powercon Corp. Of Severn, Md. Other types of interlock mechanisms 111 may be used. The interlock mechanism 111 operates with a load break switch (not shown) to cut power to the electrical component(s) housed within the electrical component enclosure 100 when the handle of the interlock mechanism 111 is opened.

As best shown in FIGS. 2A-2E, the door interlock apparatus 108 includes a body 210 configured to couple to a first one of the door 106 and the enclosure 104 (e.g., the enclosure door frame 104F). The body 210 may be a block of rigid material, such as aluminum, although the body 210 may be a non-metal material such as a plastic material in some embodiments. Other suitably rigid materials may be used. The body 210 may have a length of between about 75 mm and about 175 mm, and about 125 mm in some embodiments; a width of about 15-50 mm, and about 25 in some embodiments; and a thickness of between about 20 mm and about 40 mm, and about 25 mm in some embodiments. Other body dimensions may be used. The body 210 may have one or more angled self-locating features 212 formed therein. Further, the door interlock apparatus 108 has a locking protrusion 214 extending from a surface of the body 210. Door interlock apparatus 108 has a misalignment-accommodating mechanism 216 configured to allow motion of the body 210. The motion may be along a direction 215 (e.g., generally vertical) that is co-parallel with a door hinge axis 115 (FIG. 1A). For example, the motion may be along the door frame 106F.

In the depicted embodiment, the one or more angled self-locating features 212 comprise engagement surfaces 212U, 212L that may be angled at an angle 217 of between about 45 degrees and 80 degrees to one another, and about 66 degrees as shown. In particular, the angled self-locating features 212 may comprise non-parallel engagement surfaces 212U, 212L. As shown, the non-parallel engagement surfaces 212U, 212L are positioned on opposite sides of the locking protrusion 214. At least one of the surfaces (e.g., 212U) may be angled at more than a few degrees from the horizontal so as to form a ramp.

The locking protrusion 214 may be configured as and comprise a rigid cylindrical member, such as a steel pin, that may be press fitted into a hole 210H formed in the body 210, such that the locking protrusion 214 extends from a surface 210S of the body 210 within a recess 218 formed in the body 210. The locking protrusion 214 may be integral with the body in some embodiments. For example, the body 210 and locking protrusion 214 may be integrally formed, such as by casting, forging, or molding. In some embodiments, the body 210 may be plastic and the locking protrusion 214 may be metallic. The recess 218 may have a depth "d" of between about 10 mm and about 25 mm, for example. Other depths may be used. The recess 218 may form the angled self-locating features 212, which may be non-parallel surfaces. The engagement surfaces 212U, 212L may be provided at roughly right angles to the surface 210S.

The recess 218 may thus be configured in a manner that has a wider opening away from the locking protrusion 214, and wherein the recess 218 height gets narrower nearer to the locking protrusion 214. Radiused corners 218R may be provided on the mouth of the recess 218. The recess 218 may include an end pocket 218P provided at a location opposite of the mouth that may interface with the locking member of the interlock mechanism 111.

The misalignment-accommodating mechanism 216 may be configured as, and comprise, one or more slots 220U, 220L formed in the body 210 and one or more sliders 224U, 224L received in the one or more slots 220U, 220L. In the depicted embodiment, two slots 220U, 220L are provided with a length of the slots (e.g., the longer dimension) being aligned with a length of the door frame 106F. The slots 220U, 220L may each include a rear portion 222U, 222L that interfaces with a pilot 224P formed on the sliders 224U, 224L (See representative slide 224U in FIG. 2D), and a front portion 223U, 223L that is larger than the rear portions 222U, 222L and recessed to accept a head 224H of the slider 224U therein. The sliders 224U, 224L may include a threaded portion 224T thereon that may be threaded into captured nuts 225 provided on the door frame 106F, for example.

In the depicted embodiment, the sliders 224 comprise shoulder screws. However, this structure may be replaced with a conventional screw and cylindrical bushing. In the depicted embodiment, the misalignment-accommodating mechanism 216 comprises the first slot 220U and the second slot 220L formed in the body 210, and a first slider 224U slideably received in the first slot 220U and a second slider 224L slideably received in the second slot 220L.

In an alternative embodiment, the misalignment-accommodating mechanism may include slots formed on the enclosure door frame and the sliders may be mounted into a side of the body opposite from the locking projection and slide in the slots. The sliders may be integral with the body in another embodiment. In yet other embodiments, only a single slider may be used, whereas the single slider may include rotation-retaining means, such as one or more planar surfaces that ride on one or more sides of a single slot to restrict the body 210 to motion along direction 215 (e.g., generally vertical motion as shown). In other embodiments, the orientation of the body 210 and the one or more slots 220U, 220L may be such that the motion direction is other than along the door frame 106F (e.g., at an angle to the door frame 106F along the long side of the door 106). Any suitable mechanism for facilitating limited sliding motion of the body 210 may be used. In some embodiments, one or more springs may spring bias the body 210. For example, one or more springs may act between the one or more sliders 224U, 224L and the body 210, or between the body 210 and the door frame 106F (or enclosure structure if attached thereto) to spring bias the body 210. The spring biasing may center the body 210 within its motion range, or bias the body 210 to one end of the motion range. Adding spring biasing may allow the interlock apparatus 108 to be installed in other than a vertical orientation shown. For example, the interlock apparatus 108 may be installed along a horizontal door edge.

The rear portions 222U, 222L of the slots 220U, 220L may be sized relative to the height and diameter of the pilot 224P such that the body 210 may freely slide along the direction 215 within a large alignment zone, yet is restrained from any significant motion in the directions 226, 228. For example, the slots 220U, 220L may be dimensioned along their respective lengths to allow the body 210 to move relative to the door frame 106F in the direction 215 substantially more than in the other directions 226, 228. The misalignment-accommodating mechanism 216 may allow door misalignment in the direction 215 that may be greater than about 10 mm, or even greater than 15 mm, and between 10 mm and 30 mm in some embodiments. The misalignment-accommodating mechanism 216 may be configured to allow motion of the body 210 of up to about 20 mm along direction 215 in some embodiments. Other motion amounts may be allowed.

In accordance with another aspect, the body 210 may be constrained by the misalignment-accommodating mechanism 216 in the directions 226, 228 such that motions in these directions are less than about 12 mm, or even less than about 5 mm, and between 3 mm and 12 mm in some embodiments.

Figure 3A:
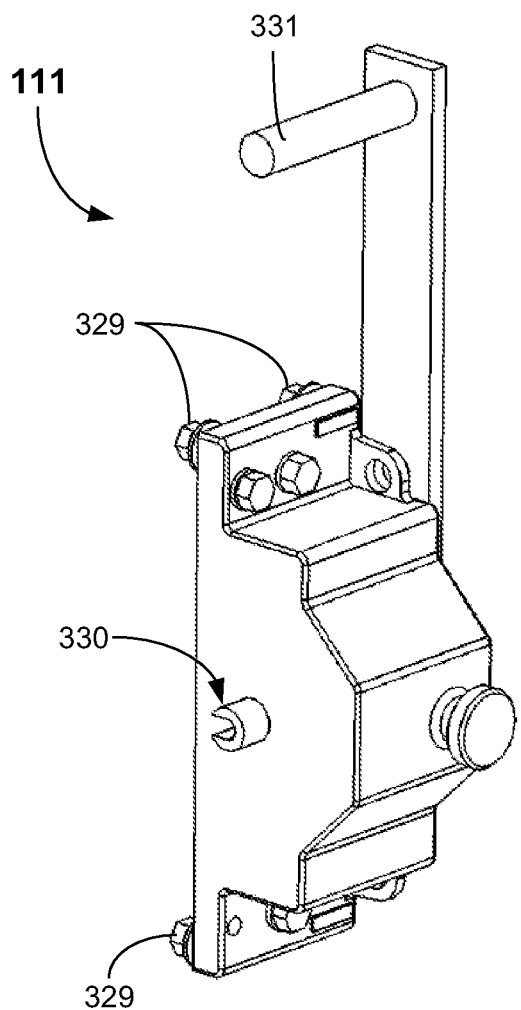
FIG. 3A illustrates a perspective view of an interlock mechanism according to embodiments.
Figure 3B:
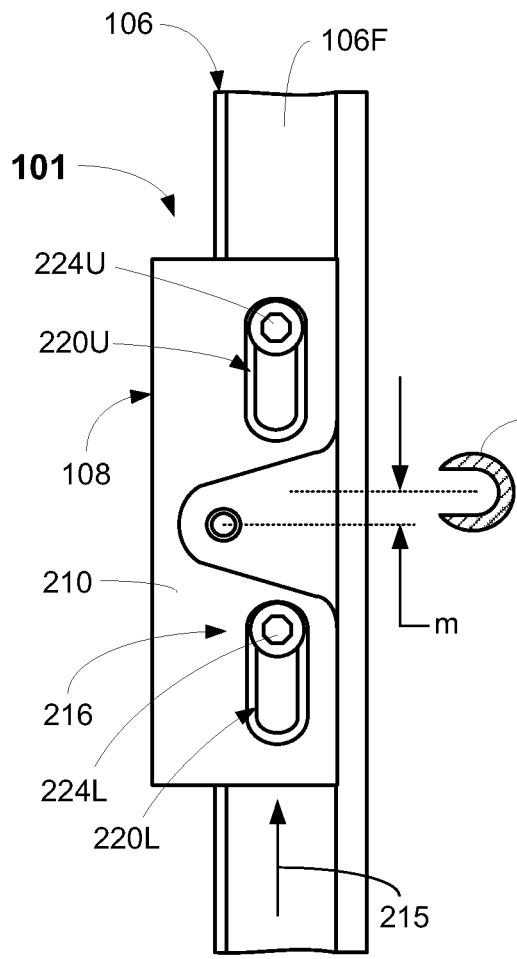
FIG. 3B illustrates a partial side view of a door interlock assembly with the door opened according to embodiments.

FIG. 3A illustrates an interlock mechanism 111 that is configured to couple to a second one of the door 106 and the enclosure structure 104 (e.g., to enclosure door frame 104F) via fasteners 329. The interlock mechanism 111 has a locking member 330 that is configured to mechanically couple with the locking protrusion 214. The operation of the door interlock assembly 101 is shown in FIGS. 3B and 3O. In particular, the door interlock apparatus 108 is shown coupled to the door frame 106F. When the door is open (FIG. 3B), the misalignment-accommodating mechanism 216 provides a configuration where the sliders 224U, 224L are located at the top of the slots 220U, 220L via the force of gravity. Thus, the body 210 is offset from a roughly centered position. As such, some misalignment "m" between the locking protrusion 214 and the locking member 330 of the interlock mechanism 111 exists, even for a perfectly aligned door 106.

Figure 3C:
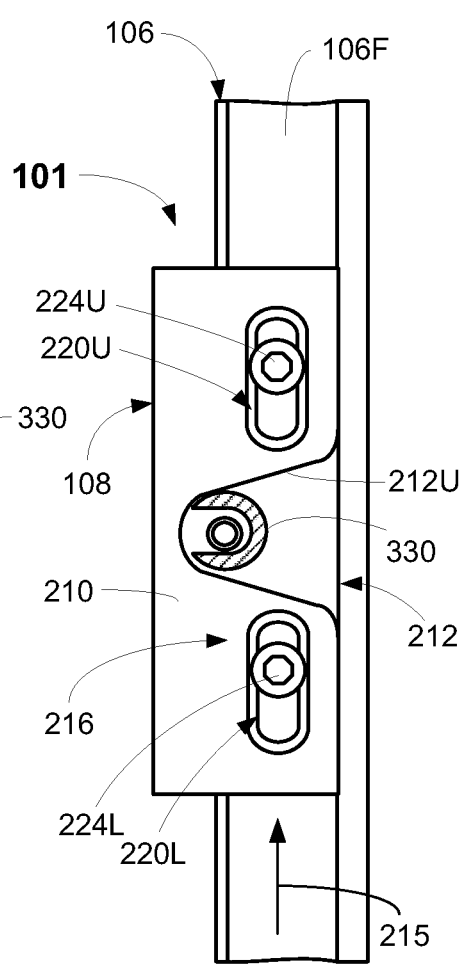
FIG. 3O illustrates a partial side view of a door interlock assembly with the door closed according to embodiments.
FIG. 3D illustrates a partial side view of a door interlock assembly with the door closed and interlocked according to embodiments.

FIG. 3C illustrates the door interlock assembly 101 as the door 106 is being a closed. As the door 106 is closed, the outer surface (e.g., cylindrical surface) of the locking member 330 contacts a top one 212U of the one or more angled self-locating features 212, and thus raises the body 210 relative to the door frame 106F. The same operating principle holds true when the door 106 is misaligned within the locking member 330 of the interlock mechanism 111. Any misalignment is accommodated by the door interlock assembly 101. In particular, the door interlock apparatus 108 may allow motion of the body 210 in the direction 215 that may be greater than about 10 mm, or even greater than 15 mm, and between 10 mm and 30 mm in some embodiments.

Figure 4:
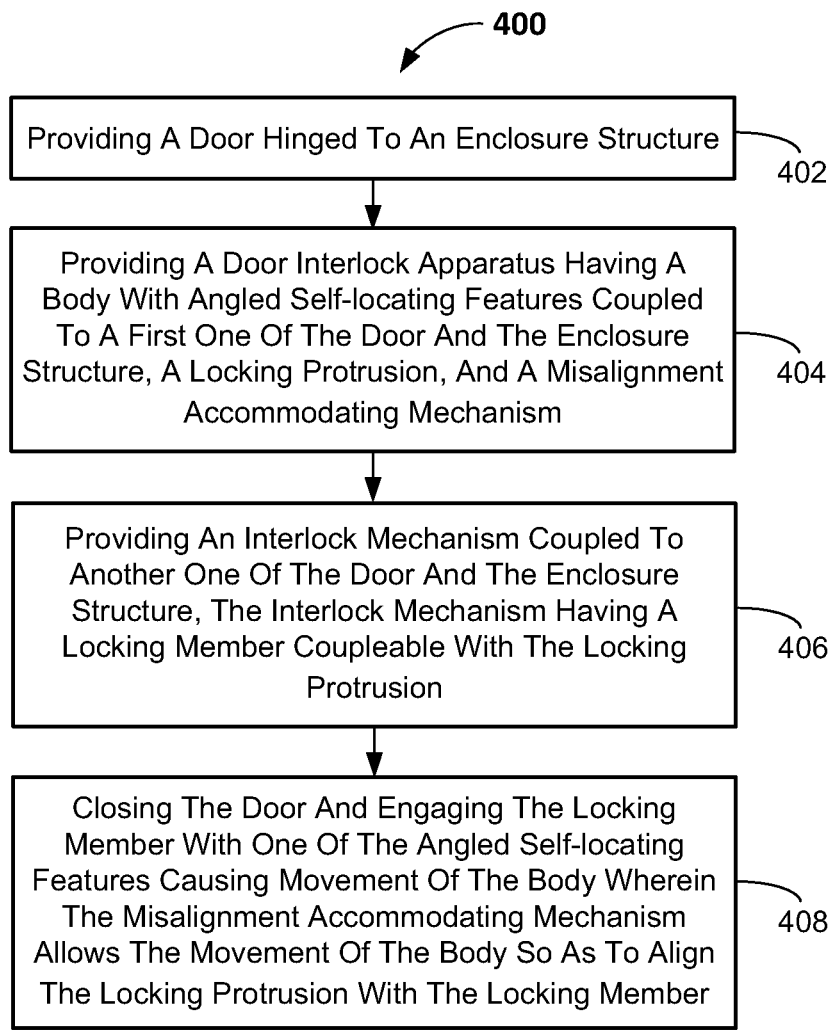
FIG. 4 illustrates a method of operating a door interlock assembly according to embodiments.

FIG. 4 illustrates a method 400 of operating a door interlock assembly (e.g., door interlock assembly 101) in accordance with one or more embodiments. Method 400 includes, at block 402, providing a door (e.g., door 106) hinged to an enclosure structure (e.g., enclosure structure 104), and in block 404, providing a door interlock apparatus (e.g., door interlock apparatus 108) having a body (e.g., body 110)

coupled to a first one of the door and the enclosure structure, the body having one or more angled self-locating features (e.g., one or more angled self-locating features 212), a locking protrusion (e.g., locking protrusion 214), and a misalignment-accommodating mechanism (e.g., misalignment-accommodating mechanism 216). In block 406, the method 400 involves providing an interlock mechanism (e.g., interlock mechanism 111). coupled to another one (e.g., the other one) of the door and the enclosure structure, the interlock mechanism having a locking member (e.g., locking member 330) that is coupleable with the locking protrusion. In block 408, the method 400 of operating a door interlock assembly includes closing the door and engaging the locking member with one of the angled self-locating features causing movement of the body wherein the misalignment-accommodating mechanism allows the movement of the body so as to align the locking protrusion with the locking member.

Figure 3D:
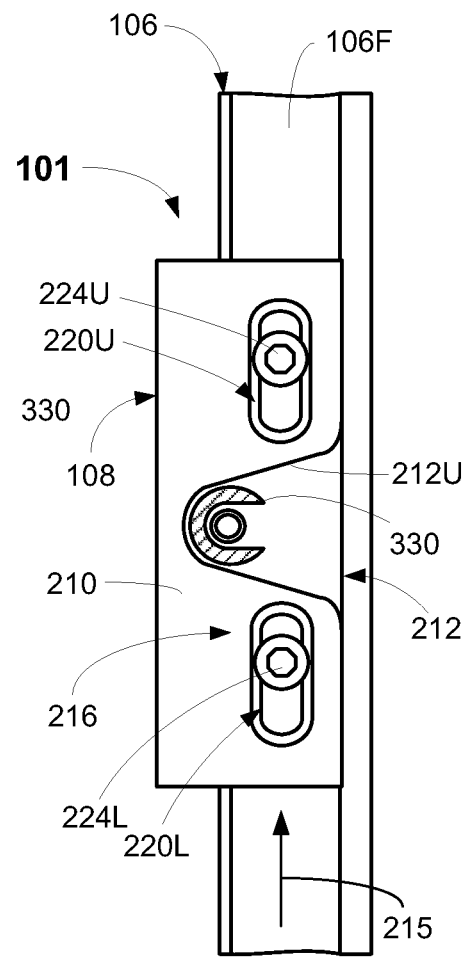

As is illustrated in FIG. 3B, the door interlock apparatus 108 may be installed low enough on the door 106 (or optionally to the enclosure structure 104) and include motion capability sufficient to anticipate and accommodate a maximum amount of misalignment (e.g., due to assembly, tolerance stack-ups, and wear) and still vertically align the locking protrusion 214 with the locking member 330. In FIG. 3D, the locking protrusion 214 of the door interlock apparatus 108 is shown captured by the locking member 330, such that the door 106 is interlocked and cannot be opened. The locking member 330 may include a notch that receives the locking protrusion 214 and is rotated responsive to throwing the handle 331 of the interlock mechanism 111. This locks the door 106 to the enclosure structure 104 and also actuated and electrical switch (not shown) electrically coupled to the one or more electrical components contained in the electrical component enclosure 100. Any suitable shape of the locking member 330 may be used, as long as the locking member 330 will capture the locking protrusion 214. In some embodiments, an Interlock mechanism 111 having a linearly-moving locking member may be used. The linearly-moving locking member may translate in front of the locking protrusion 214 upon actuation of a handle (like handle 331) of the Interlock mechanism. In some embodiments, the door interlock apparatus 108 may be mounted on or be part of an Interlock mechanism, which may be considered as being on part of the enclosure structure.

It should be understood that the above process blocks of method 400 may be executed or performed in an order or sequence not limited to the order and sequence shown and described. Also, some of the above blocks may be executed or performed substantially simultaneously or in parallel where appropriate or desired. For example, in some embodiments, blocks 402, 404, and 406 may be performed in reverse order or in parallel or substantially simultaneously.

Note that a person of ordinary skill in the art should readily appreciate that the invention described herein is susceptible of broad utility and application. Many embodiments and adaptations of the invention other than those described herein, as well as many variations, modifications, and equivalent arrangements, will be apparent from, or reasonably suggested by, the invention and the foregoing description thereof, without departing from the substance or scope of the invention. Accordingly, while the invention has been described herein in detail in relation to specific embodiments, it is to be understood that this disclosure is only illustrative and presents examples of the invention and is made merely for purposes of providing a full and enabling disclosure of the invention. This disclosure is not intended to limit the invention to the particular apparatus, assemblies or methods disclosed, but, to the contrary, the intention is to cover all modifications, equivalents, and alternatives falling within the scope of the invention.

What is claimed is:

1. A door interlock apparatus, comprising:
    a body configured to couple to a first one of a door or an enclosure door frame, the body having one or more angled self-locating features positioned on an interior surface that defines a portion of a cavity in the body;
    a locking protrusion extending outwardly from the interior surface of the body, and the locking protrusion configured to couple with a rotatable locking member of an interlock mechanism; and
    a misalignment-accommodating mechanism configured to allow motion of the body in a direction parallel with a hinge rotational axis of the door in response to the rotatable locking member contacting the one or more angled self-locating features; and
    the interlock mechanism being configured to allow electric power to be supplied within an enclosure attached to the door frame when the locking protrusion is coupled to the rotatable locking member.

2. The door interlock apparatus of claim 1 wherein the one or more angled self-locating features each include an engagement surface that is angled at an angle of between about +/−22.5 degrees to +/−40 degrees from a horizontal.

3. The door interlock apparatus of claim 1 wherein the body includes two angled self-locating features that each include an engagement surface and wherein the two engagement surfaces are not parallel to each other.

4. The door interlock apparatus of claim 3 wherein the two non-parallel engagement surfaces are positioned on opposite sides of the locking protrusion.

5. The door interlock apparatus of claim 1 wherein the body is attached to a door frame of the door.

6. The door interlock apparatus of claim 1 wherein the locking protrusion comprises a pin.

7. The door interlock apparatus of claim 1 wherein the misalignment-accommodating mechanism comprises one or more slots formed in the body and a slider received in one of the one or more slots.

8. The door interlock apparatus of claim 7 wherein the slider comprises a shoulder screw.

9. The door interlock apparatus of claim 1 wherein the misalignment-accommodating mechanism comprises a first slot and a second slot formed in the body and a first slider is received in the first slot and a second slider is received in the second slot.

10. The door interlock apparatus of claim 1 wherein the body comprises a rigid block having a recess forming two angled self-locating features as non-parallel surfaces, the locking protrusion configured as a pin, and the misalignment-accommodating mechanism configured as first and second sliders received in first and second slots, respectively.

11. The door interlock apparatus of claim 1 wherein the misalignment-accommodating mechanism is configured to allow motion of the body of greater than about 10 mm.

12. The door interlock apparatus of claim 1 wherein the misalignment-accommodating mechanism is configured to allow motion of the body of up to about 20 mm.

13. The door interlock apparatus of claim 1 wherein the misalignment-accommodating mechanism is configured to allow motion of the body of between about 10 mm and about 30 mm.

14. A door interlock assembly, comprising:
a door interlock apparatus having
- a body configured to couple to a first one of a door or an enclosure structure, the body having one or more angled self-locating features positioned on an interior surface that defines a portion of a cavity in the body,
- a locking protrusion extending outwardly from the interior surface of the body,
- a misalignment-accommodating mechanism; and
- an interlock mechanism configured to couple to a second one of the door and the enclosure structure, the interlock mechanism having a rotatable locking member configured to couple with the locking protrusion; wherein:
- the misalignment-accommodating mechanism is configured to allow motion of the body in a direction parallel with a hinge rotational axis of the door in response to the rotatable locking member contacting the one or more angled self-locating features; and
- the interlock mechanism being configured to allow electric power to be supplied within the enclosure structure when the locking protrusion is coupled to the rotatable locking member.

15. An electrical component enclosure, comprising:
an enclosure structure;
a door hinged to the enclosure structure; and
a door interlock apparatus having
- a body configured to couple to a first one of the door or the enclosure structure, the body having one or more angled self-locating features positioned on an interior surface that defines a portion of a cavity in the body,
- a locking protrusion extending outwardly from the interior surface of the body the body,
- a misalignment-accommodating mechanism; and
- an interlock mechanism configured to couple to a second one of the door and the enclosure structure, the interlock mechanism having a rotatable locking member configured to couple with the locking protrusion; wherein:
- the misalignment-accommodating mechanism is configured to allow motion of the body in a direction parallel with a hinge rotational axis of the door in response to the locking member contacting the one or more angled self-locating features; and
- the interlock apparatus being configured to allow electric power to be supplied within the enclosure structure when the locking protrusion is coupled to the locking member.

\* \* \* \* \*